United States Patent
Suzuki (10) Patent No.: US 8,628,093 B2
(45) Date of Patent: Jan. 14, 2014

(54) GROMMET

(75) Inventor: Takashi Suzuki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 56 days.

(21) Appl. No.: 13/204,787

(22) Filed: Aug. 8, 2011

(65) Prior Publication Data

US 2012/0146295 A1 Jun. 14, 2012

(30) Foreign Application Priority Data

Dec. 10, 2010 (JP) ................................. 2010-276439

(51) Int. Cl.
*F16L 21/05* (2006.01)
*F16J 15/52* (2006.01)

(52) U.S. Cl.
USPC ........................................ 277/603; 277/635

(58) Field of Classification Search
USPC ........................... 277/630, 634, 635, 637, 603
See application file for complete search history.

(56) References Cited

U.S. PATENT DOCUMENTS

| 4,945,193 | A | * | 7/1990 | Oikawa et al. | ............ | 174/153 G |
| 5,138,117 | A | * | 8/1992 | Oikawa et al. | ............ | 174/152 G |
| 6,901,627 | B2 | * | 6/2005 | Uchida | ............................ | 16/2.1 |
| 7,915,534 | B2 | * | 3/2011 | Uchibori et al. | .......... | 174/152 G |
| 2006/0243484 | A1 | * | 11/2006 | Serizawa et al. | .............. | 174/659 |
| 2011/0203833 | A1 | * | 8/2011 | Miyakoshi et al. | ........ | 174/153 G |

FOREIGN PATENT DOCUMENTS

JP 9-27226 1/1997

* cited by examiner

*Primary Examiner* — Vishal Patel
*Assistant Examiner* — Stacy Warren
(74) *Attorney, Agent, or Firm* — Gerald E. Hespos; Michael J. Porco; Matthew T. Hespos (57) ABSTRACT

A waterproof sealing lip section is pressed onto a vehicle body panel, thereby enhancing a high waterproof function even if projecting amounts in height of the burrs are random. A conical waterproof flange projects from an outer peripheral surface of a body side cylinder for passing the wire harness so that the waterproof flange is inclined on the outer peripheral surface. An annular bent end extends from the conical waterproof flange. First and second annular sealing lips project from an inner surface of the bent end. The first and second sealing lips of the waterproof flange are pressed onto the vehicle body panel.

8 Claims, 6 Drawing Sheets

GROMMET

BACKGROUND OF THE INVENTION

1. Field of the Invention

This invention relates to a grommet, and more particularly relates to a grommet that is mounted on a wire harness to be arranged in a motor vehicle and is attached to a burred through-hole in a vehicle body panel.

2. Description of the Related Art

A wire harness that extends from an outer compartment of a motor vehicle, such as an engine compartment, to an inner compartment, such as a driver's compartment, passes through a through hole in a vehicle body panel that partitions the outer and inner compartments. A grommet is mounted on the wire harness and is attached to the through-hole to effect waterproof, dustproof, and soundproof functions.

The prior art includes various kinds of grommets, including, a one-body grommet made of a rubber or an elastomer, and a two-body grommet that has a grommet main body made of a rubber or an elastomer and a resin inner incorporated with the grommet main body.

Figure 6A:
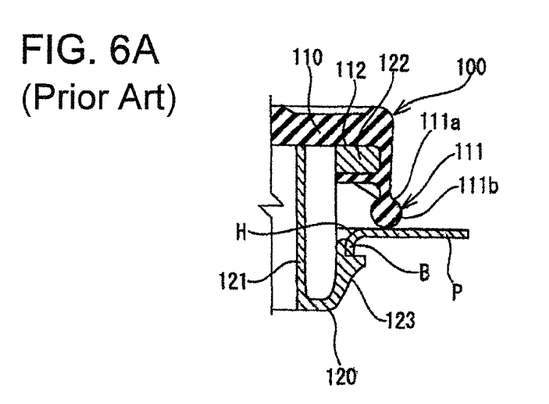
FIGS. 6A to 6C are section views of main parts of a conventional grommet.
Figure 6B:
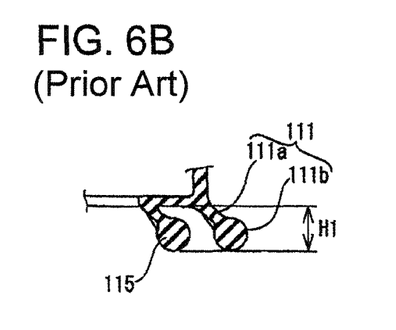

JP HEI 9 (1997)-27226 A and FIGS. 6A to 6B herein disclose a two-body grommet that is used when a through-hole in a vehicle body panel is a burred hole. With reference to FIG. 6A, a two-body grommet 100 includes a grommet main body 110 made of a rubber and a resin inner support 120. The grommet main body 110 includes a waterproof sealing portion 111 that contacts a vehicle body panel P. On the other hand, a flange 122 projects from an end of an inner side cylindrical portion 121 of the resin inner support 120 and is inserted into an annular recess 112 in the grommet main body 110. A latch pawl 123 is formed by turning the other end of the inner side cylindrical portion 121 outward. The latch pawl 123 contacts and latches with a burr B projecting from a peripheral edge around a through-hole H in the vehicle body panel P.

An O-ring-like portion 111b is provided on the distal end of the waterproof sealing portion 111 of the grommet main body 110 and has a ball shape in cross section. The ball-like ring portion 111b is pressed onto the vehicle body panel P to effect a waterproof action. JP HEI 9 (1997)-27226 also discloses an example with another O-ring-like waterproof sealing portion 115 inside the waterproof sealing portion 111 (see FIG. 6B) and an example in which a lip-like waterproof sealing portion 116 is provided outside the O-ring-like waterproof sealing portion 115 (see FIG. 6C). These two waterproof sealing portions 115 and 116 project from an outer peripheral wall at the same height from the annular recess 112 and are oblique to the wall.

Figure 6C:
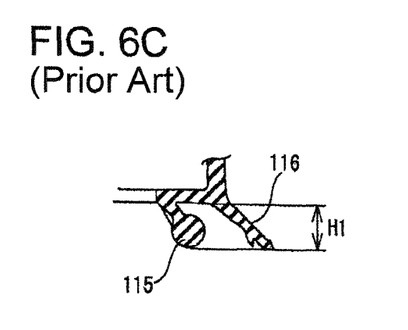

As shown in FIGS. 6B and 6C, the conventional grommet includes two waterproof sealing portions with equal projecting heights H1. One waterproof sealing portion can exert its waterproof function even if the other waterproof sealing portion bites foreign particles and curls up to lose its waterproof function.

Figure 7A:
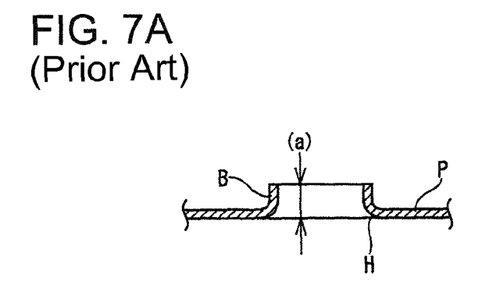
FIG. 7A is a cross section view of a burred through-hole provided in a vehicle body panel.
Figure 7B:
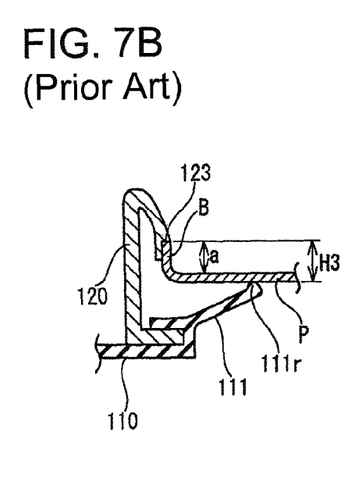
FIGS. 7B to 7D are section views of main parts of the conventional grommet, illustrating a problem that occurs when attaching the grommet to the through-hole in the case where projecting amounts in height of the burrs are random.
Figure 7C:
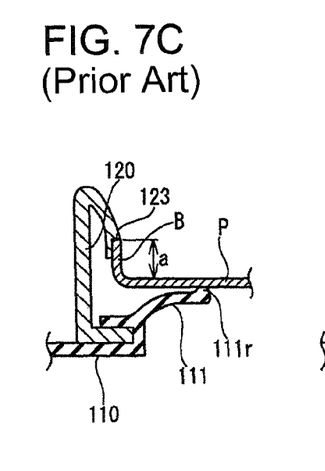
Figure 7D:
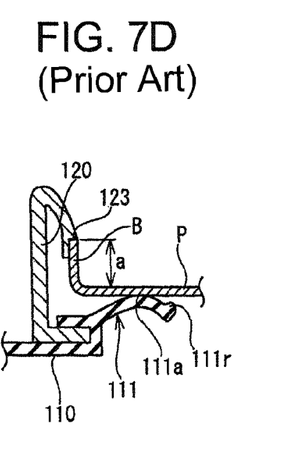

As shown in FIG. 7A, a burred hole formed in the vehicle body panel P has a burr B that projects from an inner peripheral edge around the through-hole H in the vehicle body panel P. A height (a) of the burr B is likely to be random, as shown in FIGS. 7B, 7C, and 7D. On the other hand, a height H3 between the latch pawl 123 of the resin inner support 120 and a lip 111r on a distal end of the waterproof sealing portion 111 of the grommet main body 110 are constant.

Accordingly, as shown in FIG. 7C, if the projecting height (a) of the burr B is formed into a designed height precisely, the lip 111r of the waterproof sealing portion 111 is pressed onto the vehicle body panel P by a given contact pressure. However, as shown in FIG. 7B, if the height (a) of the burr B is small, the lip 111r of the waterproof portion 111 lightly contacts the vehicle body panel P and is not pressed onto the panel P by the given contact pressure. This may cause a clearance between the lip 111r and the panel P. As shown in FIG. 7D, if the projecting height (a) of the burr B is great, a contact wall 111a of the waterproof sealing portion 111 contacts the vehicle body panel P and the lip 111r does not push the panel P. This will cause a clearance between the lip 111r and the panel P or this will exert less than the given contact pressure between the lip 111r and the panel P.

Accordingly, even if two waterproof sealing portions are provided on the grommet main body, as shown in FIGS. 6B and 6C, they cannot reply to the random projecting heights of the burrs, since the projecting heights of the two waterproof sealing portions are same.

In view of the above problems, an object of the invention is to provide a grommet that can provide a high waterproof function at a burred through-hole in a vehicle body panel even if projecting heights of the burrs are random.

SUMMARY OF THE INVENTION

The invention is directed to a grommet to be mounted on a wire harness that is inserted into a burred through-hole in a vehicle body panel and is fit to an inner peripheral surface of the through-hole. The grommet has a body side cylinder for receiving the wire harness. An annular waterproof flange projects from an outer peripheral surface of the body side cylinder and is conically generated to incline on the outer peripheral surface. A first sealing lip is formed as an annular projection on a surface of the waterproof flange. A bent end is provided on an end of the first sealing lip and has an inclination angle different from the inclination angle of the waterproof flange. A second end sealing lip is formed into an annular projection on one surface of the bent end. The first and second sealing lips of the waterproof flange are pressed onto the vehicle body panel and the end bent portion is bent toward the vehicle body panel.

As described above, the sealing lips on the conical inclined waterproof flange and the bent end contact the vehicle body panel. The bent end is bent toward the vehicle body panel. The two sealing lips are at greatly different height positions from the waterproof flange. If a distance in height between the first sealing lip and the vehicle body panel is L1 while a distance in height between the second sealing lip and the vehicle body panel is L2, it is preferable that L1 is greater than L2 (L1>L2) and subtracting L2 from L1 gives 2 to 7 millimeters (L1−L2=2 to 7 mm).

The different heights of the juxtaposed sealing lips enable either sealing lip to contact the vehicle body panel with the given contact pressure, even if the projecting amounts in height of the burrs are random.

More particularly, if the projecting height of the burr is small, the second sealing lip, which is closer to the vehicle body panel, can contact the vehicle body panel. If the projecting height of the burr is great, the first sealing lip, which is farther from the vehicle body panel can contact the vehicle body panel. Thus, a contact pressure of more than a given pressure can be obtained.

The first and second sealing lips may have outer peripheral end edges that are not round shapes, but are angular shapes.

A valley-like clearance will be caused between the sealing lips and the vehicle body panel if the outer peripheral end edges of the sealing lips are round and a water pressure cannot escape from the valley-like clearance. Consequently, water pressure applied to the grommet from the outside due to splashing will easily enter the contact surfaces between the sealing lips and the vehicle body panel.

However, there is no narrow clearance between angularly shaped sealing lips and the vehicle body panel, thereby preventing water from entering the contact surfaces between the sealing lips and the vehicle body panel.

The grommet of the invention is a two-body grommet, as is in JP HEI 9 (1997)-27226, and comprises a grommet main body made of a rubber or an elastomer and a resin inner support incorporated with the grommet main body. The grommet main body includes the body side cylinder through which the wire harness passes. An enlarged diameter end surface portion continues to an end of the body side cylinder. A latch recess is continued to an outer periphery of the enlarged diameter end surface and has a U-shape in cross section. The waterproof flange projects from a distal end of the latch recess. The resin inner support includes an inner cylinder. A latch flange is provided on an end of the inner side cylinder and is inserted into the latch recess in the grommet main body. A burr latch projects from the other end of the inner side cylindrical portion. The burr latch of the resin inner support engages a projecting end of the burr that protrudes from the periphery of the through-hole in the vehicle body panel to the other side of the panel. The first and second sealing lips are pressed onto one side of the vehicle body panel.

The grommet of the invention may be a one-body grommet made of a rubber or an elastomer and provided with no resin inner support. One side wall of the one-body grommet at a side opposite the burr projecting side of the annular vehicle body latch recess on an outer peripheral surface of the body side cylinder may project as a flange, and the first and second sealing lips may be provided on the flange.

In the one-body grommet, the burr is contained in the vehicle body latch recess. However, even if projecting amounts in height of the burrs are random, either of the first sealing lip on the flange and the second end sealing lip on the flange can contact the vehicle body panel by a given contact pressure, thereby obtaining a grommet having a high waterproof function.

It will be apparent from the foregoing that the first and second sealing lips are different in height and contact the vehicle body panel at the side opposite from the projecting side of the burr. Thus, either of the sealing lips can contact the vehicle body panel by more than the given pressure and create a waterproof seal, even if the projecting heights of the burrs are random.

The sealing lips are provided on the conical waterproof flange that is inclined toward the vehicle body panel, the waterproof flange is provided on the distal end with the end bent portion, the end sealing lip projects from the end bent portion, and the projecting heights of the first and second sealing lips are different from each other greatly. Since the waterproof flange with the waterproof sealing lips is made of a flexible rubber, the waterproof flange can be deflected readily. Accordingly, it is possible for the two sealing lips to deal with the random projecting heights of the burrs, thereby obtaining a grommet with an excellent waterproof function, even if the projecting amounts in height of the burrs are random greatly or slightly.

DETAILED DESCRIPTION OF THE PREFERRED EMBODIMENTS

Figure 1A:
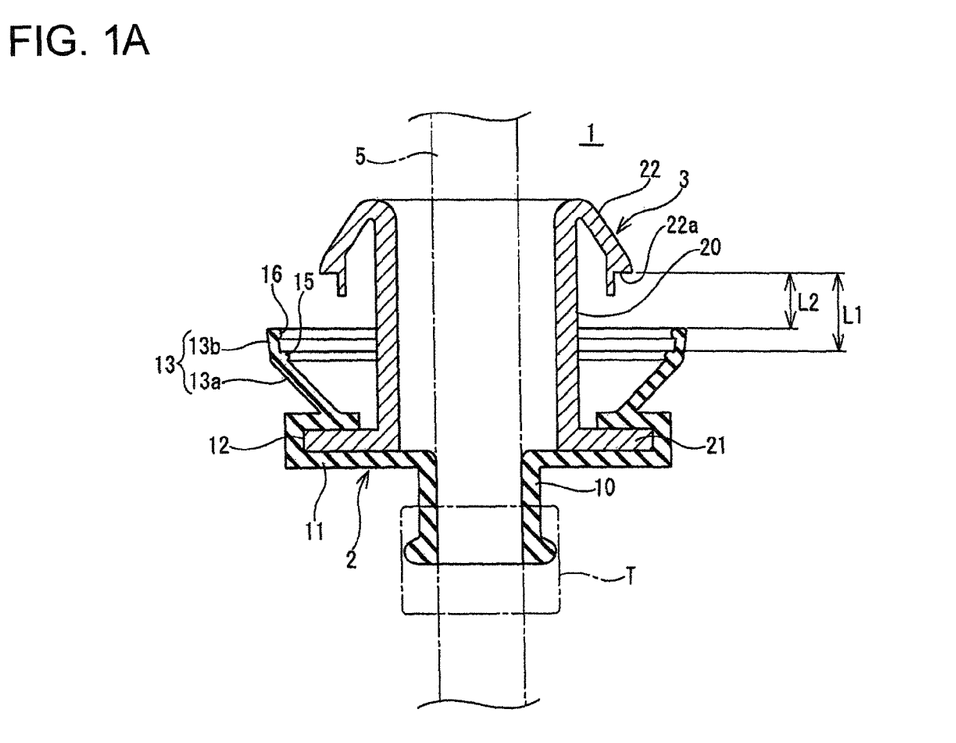
FIG. 1A is a section view of a first embodiment of a grommet in accordance with the present invention.
Figure 1B:
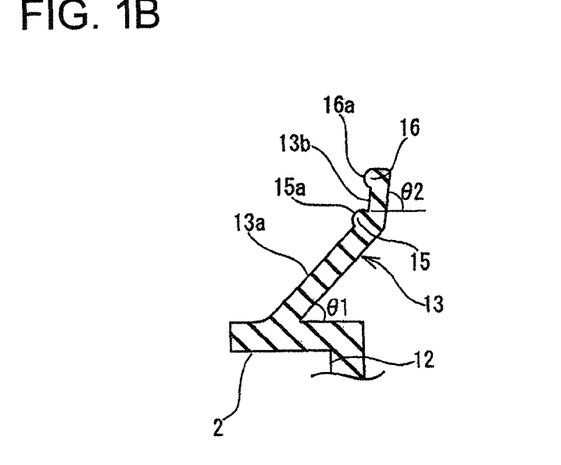
FIG. 1B is an enlarged cross section view of a main part of the grommet shown in FIG. 1A.
Figure 2A:
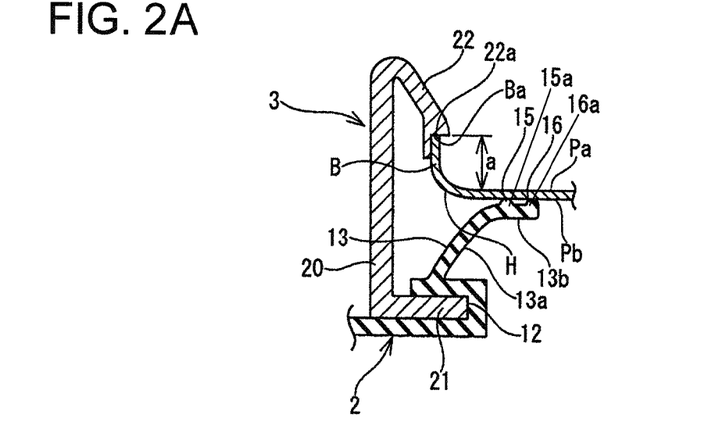
FIGS. 2A to 2C are enlarged views of the main part of the grommet, illustrating mechanical actions of the grommet.
Figure 2B:
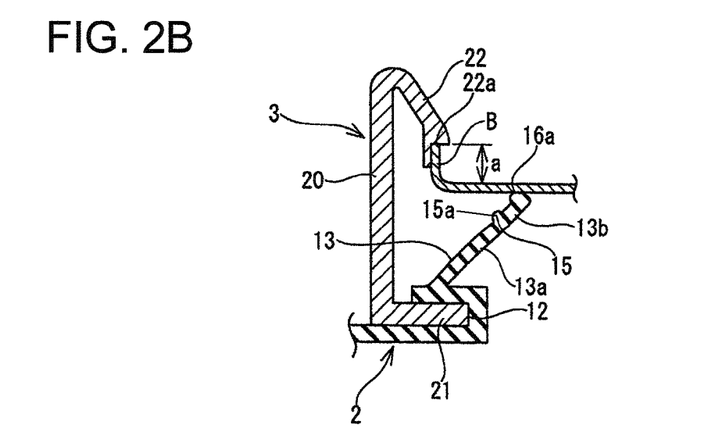
Figure 2C:
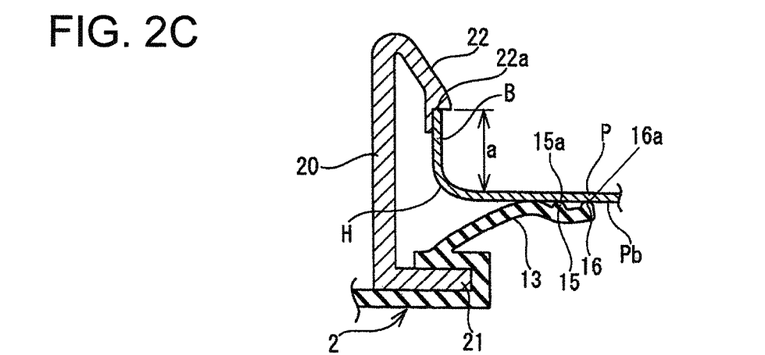

A grommet in accordance with a first embodiment of invention is identified by the numeral 1 in FIGS. 1A to 2C. The grommet 1 is a two-body grommet in which a grommet main body 2 made of a rubber or an elastomer and a resin inner support 3 made of a resin molding product are incorporated with each other. The grommet 1 is mounted on an outside of a wire harness 5 that is arranged along a vehicle body panel and an end of the grommet 1 is secured to the wire harness 5 by winding an adhesive tape T (FIG. 1A) around them. As shown in FIGS. 2A to 2C, the wire harness 5, on which the grommet 1 is mounted, is inserted into the burred through-hole H in a vehicle body panel P and the grommet 1 is engaged with a peripheral edge around the through-hole H to obtain waterproof, dustproof, and soundproof functions.

As shown in FIG. 1A, the grommet main body 2 includes a body side cylindrical portion 10 that closely receives the wire harness 5, an enlarged diameter end portion 11 continued from an end of the body side cylindrical portion 10, a latch recess 12 that is formed by bending an outer peripheral end of the enlarged diameter end portion 11 to make a U-shape in cross section, and a waterproof flange 13 that projects from a distal end of the latch recess 12.

As shown in FIG. 1B, the waterproof flange 13 has a flange main body 13a at an end of the waterproof flange 13 remote from the body side cylindrical portion 10. The flange main body 13a has a conical shape with a constant inclination angle ($\theta 1$) and a bent end 13b with an inclination angle ($\theta 2$) at an outer peripheral side of the flange main body 13a. The inclination angle ($\theta 2$) of the flange main body 13a is set to be greater ($\theta 2 > \theta 1$) than the inclination angle ($\theta 1$). The inclination angle ($\theta 2$) of the bent end 13b is changed greater than the inclination angle ($\theta 1$) of the flange main body 13a. Thus, the bent end 13b can further approach the vehicle body panel surface.

First and second ring-like sealing lips 15 and 16 define annular projections on the inner surface of the flange main body 13a. The second ring-like sealing lip 16 is at the free end of the flange main body 13a and the first ring-like sealing lip 15 is slightly closer to the body side cylindrical portion 10.

The resin inner support 3 has an inner cylinder 20 through which the wire harness 20 passes. The inner cylinder has opposite first and second ends. A latch flange 21 projects out from the first end of the inner cylinder 20 and is inserted into the latch recess 12 in the grommet main body 2. An annular burr latch piece 22 is formed at the second end of the inner cylinder 20 by turning the second end of the inner cylinder 20 out. A latch step 22a is formed at the projecting end of the latch piece 22.

A distance L1 in height between the latch step 22a of the burr latch piece 22 and the first sealing lip 15 exceeds a distance L2 in height between the latch step 22a and the second end sealing lip 16 (L1>L2) by about 2 to 7 millimeters (L1−L2=2 to 7 mm).

The wire harness 5 is inserted into the grommet 1 that incorporates the grommet main body 2 with the resin inner support 3. The body side cylinder 10 of the grommet main body 2 then is widened to pass the wire harness 5, and is returned to the original position to closely contact with the wire harness 5. An adhesive tape T is wound around the end of the body side cylinder 10 and the wire harness 5. Under this condition, the wire harness 5 is drawn out from the end of the inner cylinder 20 of the resin inner 3 at the other end of the grommet 1.

The grommet 1 mounted on the wire harness 5 then is inserted into the through-hole H in the vehicle body panel P so that the latch step 22a on the burr latch piece 22 of the resin inner support 3 contacts an end surface Ba of the burr B that projects from a first surface Pa of the vehicle body panel P around the periphery of the through-hole H.

On the other hand, the first and/or second sealing lips 15 and 16 of the grommet main body 2 are pressed onto the second surface Pb of the vehicle body panel P around the periphery of the through-hole H with a given pressure.

As described above, there is an uneven height (a) of the burr B that projects from the through-hole H in the vehicle body panel P.

If the height (a) is precisely a designed dimension, as shown in FIG. 2A, a projecting end surface 15a of the first sealing lip 15 contacts with the second surface Pb of the vehicle body panel P by more than the given pressure. Even if the bent end 13b is deflected slightly out, the projecting end surface 16a of the second end sealing lip 16 contacts with the second surface Pb of the vehicle body panel P by more than the given pressure. Thus, it is possible for the projecting end surfaces 15a and 16a to positively cut off water leak from the second surface Pb into the through-hole H, thereby enhancing a waterproof function.

If the height (a) of the burr B is small, as shown in FIG. 2B, a distance between the second surface Pb of the vehicle body panel P and the waterproof flange 13 becomes great. In this case, a distance between the second surface Pb of the vehicle body panel P and the projecting end surface 16a of the second sealing lip 16 is short and the projecting end surface 16a of the second sealing lip 16 contacts the second surface Pb of the vehicle body panel P by more than the given pressure. Thus, it is possible for the projecting end surface 16a to positively cut off water leak from the second surface Pb into the through-hole H, thereby enhancing a waterproof function.

If the height (a) is great, as shown in FIG. 2C, a distance between the second surface Pb of the vehicle body panel P and the waterproof flange 13 becomes small. In this case, a distance between the vehicle body panel P and the projecting end surface 15a of the first sealing lip 15 is long and the projecting end surface 15a contacts the second surface Pb of the vehicle body panel P by more than the given pressure. Thus, it is possible for the projecting end surface 15a to positively cut off water leaks from the second surface Pb into the through-hole H, thereby enhancing a waterproof function. On the other hand, the bent end 13b is deflected along the second surface Pb of the vehicle body panel P. This deflected amount of the bent end 13b could cause the projecting end surface 16a of the second sealing lip 16 to contact the second surface Pb by the given pressure, to contact the second surface Pb by less than the given pressure, or not to contact the second surface Pb at all. In any case, the projecting end surface 15a of the first sealing lip 15 contacts the second surface Pb of the vehicle body panel P by more than the given pressure to obtain the waterproof function.

Figure 3A:
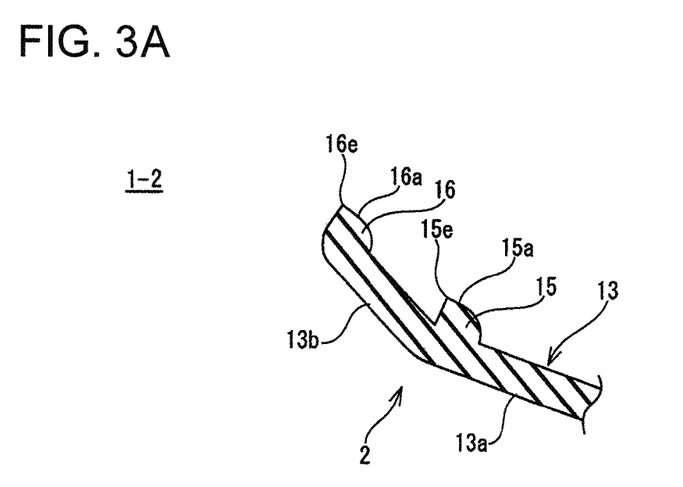
FIG. 3A is a section view of a main part of a second embodiment of the grommet in accordance with the present invention.
Figure 3B:
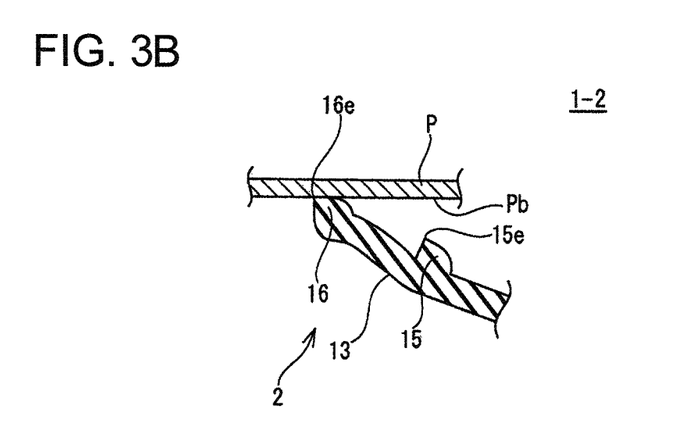
FIG. 3B is an explanatory view of a mechanical action of the grommet in the second embodiment.

FIGS. 3A and 3B show a second embodiment of the grommet 1-2. The grommet 1-2 of the second embodiment differs from the first embodiment in that outer peripheral edges of the projecting end surfaces 15a and 16a of the first and second sealing lips 15 and 16 are not round, but rather have angular shapes 15e and 16e. Parts of the grommet 1-2 in the second embodiment that are the same as those of the first embodiment are identified by the same reference numbers, but are not described again.

As described above, the first and second sealing lips 15 and 16 have the outer peripheral edges 15e and 16e on their projecting end surfaces, as shown in FIG. 3B, to prevent clearances between the second surface Pb of the vehicle body panel P and the outer peripheral end edge 16e of the second sealing lip 16. Even if a clearance is caused, a pressure of water that enters the clearance can prevent water from entering the through-hole H. Accordingly, the waterproof function of the grommet 1-2 is enhanced.

FIGS. 4A to 4C and FIG. 5 show a grommet 1-3 in accordance with a third embodiment that has a grommet main body 2 and a resin inner support 3.

Figure 4A:
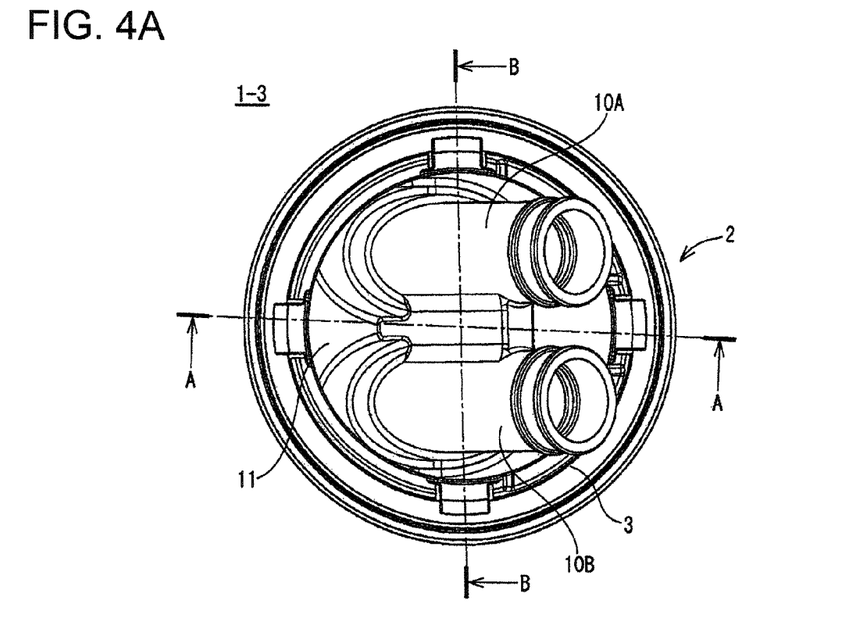
FIG. 4A is a plan view of a third embodiment of the grommet in accordance with the present invention.
Figure 4B:
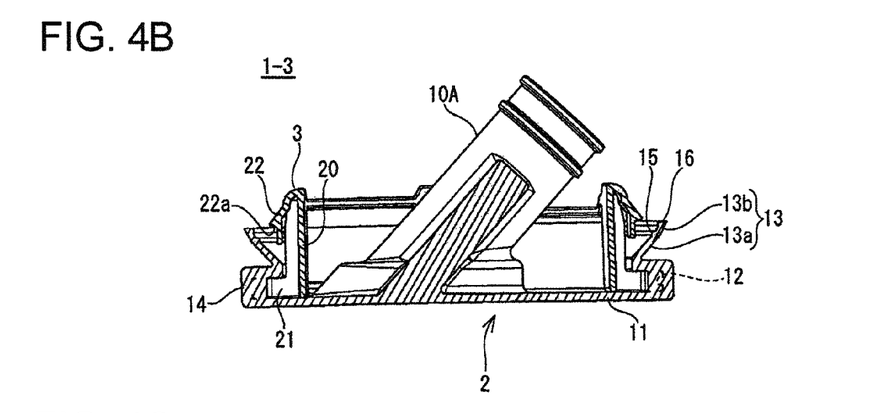
FIG. 4B is a cross section view of the grommet taken along lines A-A in FIG. 4A.
Figure 4C:
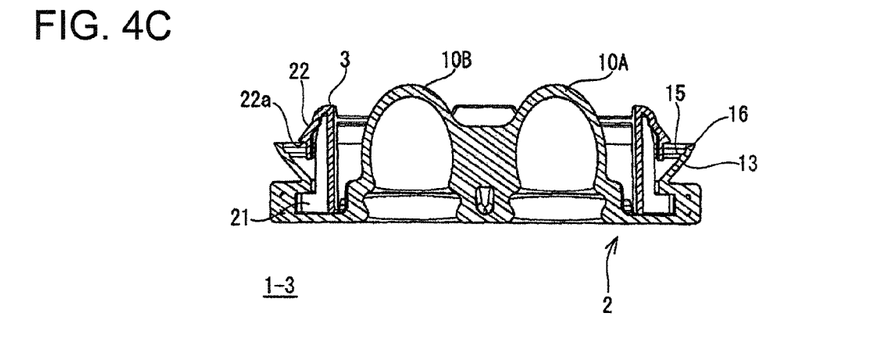
FIG. 4C is a cross section view of the grommet taken along lines B-B in FIG. 4A.

The grommet 1-3 in the third embodiment includes two cylinders 10A and 10B for passing the wire harness. The cylinders 10A and 10B have enlarged diameter end surfaces 11 at their ends. A large diameter body side cylinder 14 continues to the enlarged diameter end surface 11 and has the latch recess 12.

Figure 5:
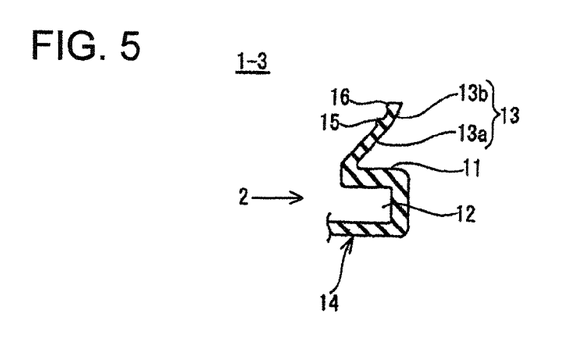
FIG. 5 is an enlarged section view of the main part of the grommet in the third embodiment.

The waterproof flange 13 projects from the outer surface of the latch recess 12. As shown in FIG. 5, the waterproof flange 13 is provided on an outer periphery of the flange main body 13a with the bent end 13b, as is the case with the first embodiment. The first sealing lip 15 projects from the outer periphery of the flange main body 13a while the second end sealing lip 16 projects from the bent end 13b.

The resin inner 3 is incorporated with the grommet main body 2. The latch flange 21 of the resin inner support 3 is inserted into the latch recess 12 of the grommet main body 2. Parts of the grommet 1-3 in the third embodiment that are the same as those of the first embodiment are identified by the same reference numbers, but are not described again.

The first and second sealing lips 15 and 16 disposed at different distances from the vehicle body panel P are provided on the waterproof flange 13 in the grommet 1-3 in the third embodiment. Thus, it is possible to obtain the waterproof function, even if the burrs are random heights projecting from the through-hole H in the vehicle body panel P.

What is claimed is:

1. A grommet to be mounted on a wire harness that is inserted into a burred through-hole in a vehicle body panel and to be fit to an inner peripheral surface of said through-hole, the grommet comprising:
a grommet main body formed from an elastomer and having opposite first and second ends, a body side cylinder formed at the first end and configured for passing the wire harness, a substantially conical waterproof flange spaced from the body side cylinder and having a concave inner surface and a convex outer surface, the convex outer surface projecting out and toward the second end at a first acute angle to a plane normal to a longitudinal axis of the body side cylinder when the grommet main body is in an unbiased condition, an annular bent end projecting from an end of the conical waterproof flange opposite the body side cylinder and having an outer peripheral surface extending from the convex outer surface of the conical waterproof flange, the outer peripheral surface of the bent end being inclined at a second acute angle to the plane normal to the longitudinal axis of the body side cylinder when the grommet main body is in an unbiased condition, the second angle being greater than the first angle, and first acute and second acute annular sealing lips formed on an inner peripheral surface of the bent end that is opposite to the outer peripheral surface, the annular bent end being deformed outward by the vehicle body panel when the grommet is mounted on the vehicle body panel so that said first and second sealing lips are pressed onto a first surface of the vehicle body panel.

2. The grommet of claim 1, wherein said first and second sealing lips have outer peripheral end edges that define angular shapes.

3. The grommet of claim 1, further comprising: a resin inner support incorporated with said grommet main body;

the grommet main body further comprising an enlarged diameter end surface portion extending out at an end of said body side cylinder opposite the first end of the grommet main body, an inwardly facing annular latch recess adjacent the enlarged diameter end surface portion and having a U-shape cross section, the waterproof flange projecting from the latch recess;

the resin inner support including an inner side cylinder with opposite first and second ends, a latch flange projecting out at the first end of the inner side cylinder and engaged in the latch recess in said grommet main body, and a burr latch piece projecting from the second end of said inner side cylinder;

said burr latch piece of said resin inner support being engageable with a projecting end of a burr that protrudes from a peripheral edge around the through-hole in the vehicle body panel to a second surface of the panel, and the first and second sealing lips being pressed onto the first surface of said vehicle body panel.

4. A two-part grommet for sealing a passage of a wiring harness through a burred through-hole in a panel, comprising:

a first component formed from a hard resin and having a first cylinder with opposite first and second ends, a first flange projecting out at the first end of the first cylinder and a burr latch piece projecting from the second end of the first cylinder; and a second component made of rubber or an elastomer and including a second cylinder dimensioned to engage around the wiring harness, a second flange extending out at an end of the second cylinder, an inwardly facing annular recess adjacent the second flange and engaging the first flange therein, a waterproof flange having a conical flange main body having a concave inner surface and a convex outer surface, the convex outer surface projecting out from a part of the second component in proximity to the annular recess at a first acute angle to a plane normal to a longitudinal axis of the second cylinder and an annular bent end extending from an end of the flange main body opposite the annular recess, the bent end having an outer peripheral surface extending from the convex outer surface of the conical waterproof flange, the outer peripheral surface of the bent end being inclined at a second acute angle to the plane normal to the longitudinal axis of the second cylinder, the second acute angle being greater than the first acute angle in an unbiased condition of the second component, and first and second annular sealing lips at axially spaced positions on an inwardly facing surface of the waterproof flange, the bent end being deformed outward by the panel when the two-part grommet is mounted on the panel so that said first and second sealing lips are pressed onto a surface of the panel.

5. The two-part grommet of claim 4, wherein the first annular sealing lip is at an end of the flange main body adjacent the bent end.

6. The two-part grommet of claim 4, wherein the second annular sealing lip is at an end of the bent end remote from the flange main body.

7. The two-part grommet of claim 6, wherein said first and second sealing lips have outer peripheral end edges that define angular shapes.

8. The two-part grommet of claim 4, wherein the latch piece of the first component is a cone flaring out and toward the first flange.

* * * * *